United States Patent [19]

Tabor

[11] Patent Number: 4,714,552

[45] Date of Patent: Dec. 22, 1987

[54] IN-LINE FLUID FILTERING DEVICES AND DISC-FILTERS USEFUL IN SUCH DEVICES

[75] Inventor: Elhanan Tabor, Carmiel, Israel

[73] Assignee: AR-KAL Plastics Products Beit Zera (1973), Israel

[21] Appl. No.: 848,313

[22] Filed: Apr. 4, 1986

[30] Foreign Application Priority Data

Jul. 24, 1985 [IL] Israel .................................. 75896
Aug. 23, 1985 [IL] Israel .................................. 76173

[51] Int. Cl.$^4$ .......................................... B01D 75/00
[52] U.S. Cl. .................................... 210/329; 210/330; 210/333.01; 210/411; 210/422; 210/427; 210/488
[58] Field of Search ................... 210/330, 333.01, 329, 210/324, 492, 488, 411, 424, 425, 427

[56] References Cited

U.S. PATENT DOCUMENTS 4,156,651  5/1979  Mehoudar .......................... 210/488

Primary Examiner—Frank Sever
Attorney, Agent, or Firm—Ostrolenk, Faber, Gerb & Soffen

[57] ABSTRACT

A filter device is disclosed, comprising two compartments within a housing. The first compartment includes a filter element, of the screen or the disc types, with communication to the filtered fluid outlet of the housing. A controllable valve communicates the first compartment with the inlet of the housing across the second compartment. A drain valve connects the first compartment with outside the housing. For flushing the filter element by reverse-flow, the first valve is closed and the flushing fluid drains through the drain valve. In a further embodiment two or more filter elements and associated compartments and valves are installed, in parallel, within the same housing, so that by stopping the filtering operation of one of the filter elements, it becomes flushed with the product, filtered fluid of the other element. The filter elements are preferably of the disc-type, and provided with a hydraulic piston and cylinder assembly for compacting and releasing the discs during the filtering and flushing modes of operation, respectively, to effect a more thorough rinsing of the discs. In addition, the displacement of the discs compacting cylinder can be controlled from outside the system.

16 Claims, 14 Drawing Figures

IN-LINE FLUID FILTERING DEVICES AND DISC-FILTERS USEFUL IN SUCH DEVICES

BACKGROUND OF THE INVENTION

The present invention relates to fluid filter devices for general, industrial applications such as sewage purification, water recovery systems in textile, plastics, etc. plants, electric power stations, swimming pool installations, compressed air systems, hydraulic or fuel systems, and the like. Without derogation from generality of the above, the invention is particularly useful in—and therefore be described with specific reference to—water irrigation systems.

Filtered water irrigation systems comprise multiple units of the following design. There is provided an elongated cylindrical housing with suitable connections to the network water supply on the one side, and to the irrigation line at the other side. Filter elements of various kinds and descriptions are installed within the housing. Usually a battery of such housings, say of 6-12 units, are connected in parallel to feed a single irrigation line, with a common, sometimes most sophisticated control system governing the operation of the various filters. Since the filter elements tend to become clogged during prolonged use thereof, the abovementioned control system includes facilities for periodically interrupting the operation of any one of the filters of the battery and cause it to undergo a flushing or rinsing stage wherein the waterflow is reversed and the filtering media included in the elements—be it a pack of discs in compact engagement, various types of perforated sheet metal or any other types known per-se in the art—become cleaned by the reversed flow of water which releases solid particles and other clogging stuff that became trapped in the filtering media.

This necessity to carry out flushing cycles from time to time (depending on the quality of the filtered water), must be automatically supervised by computer or otherwise controlled systems, which are most expensive and of a relatively poor reliability.

Among the widely used filter-media kinds there are known fluid filters of the type comprising a pack of discs or rings provided with roughened surfaces which are mounted on a common axis with the surfaces in compact engagement with each other wherein the fluid is forced to flow radially through the pack and thereby become filtered, i.e. leaving the solid particles and/or algal-type matter trapped between the discs.

Hence, a further aspect of the invention specifically concerns the method and means by which compressing or compacting of said pack is effected, and, according to a still further developed aspect thereof, also the release or loosening of the discs for periodic flushing thereof. It should be noted, in this context that while in our U.S. Pat. No. 4,665,910, issued Apr. 7, 1987, there has been disclosed means for pressing and releasing the disc pack automatically by hydraulic means—as also proposed according to the instant invention—the disclosure has been primarily assigned to a particular design suitable for reverse flushing, rinsing and disc-spinning mode of operation, as therein described and claimed.

The present invention aims, however, at providing discs tightening and releasing means readily applicable to disc-type filters of general, well-known designs. Furthermore, as will be made more clear hereinbelow, the present invention provides means readily applicable to reverse filtering flow direction as well, namely from the inner circumference of the discs radially in the outwards direction, as distinct from the usual, inwards radial flow. Conventional tightening means for filters disc packs includes, as a rule, manually-operated threadable arrangements. In more detail, the clamping-together of the discs, which are mounted on a common cylindrical support member, has been effected by a screw-threaded member for forcing a displaceable member against the battery of discs, supported at its other end by a fixed abutment surface. This method proved unsatisfactory in view of the following considerations: Since a typical disc pack is comprised of, say, 300-400 discs, no absolute assurance of an exact, uniform surface pressure between any pair of discs throughout the pack can be attained. Certain initial dislocations or deformations are necessarily present, and their combined or accumulated effect frequently results in a locally developed gap anywhere along the outer circumferential surface of the filter element. Dirt tending to accumulate within such gap, will in due course gradually infiltrate, pushing for itself more and more room and getting deeper in a wedge-like fashion until a local burst or rupture of the filter occurs. When this happens, the filtering capability of the device as a whole is drastically affected.

Secondly, since the discs are made of plastics, namely of a somewhat elastic material, under the initial tightening force, plastic deformations of each and every disc will after a while take place. Now again, such plastic deformations, tiny as they might be, are multiplied by the number of discs, and the combined loosening effect of the pack as a whole will become noticeable, particularly if the kind of dynamic operation character of the filter is to be taken into account.

One simple and immediate solution to the problem at hand, that would appear effective to eliminate the above-listed disadvantages of the screw-threading tightening method, is to provide the disc pack with spring means urging same in the compacting direction so that it will automatically compensate for every dislocation of the above-mentioned type. However, such solution is impractical because it will call for too strong a spring to achieve the desired effect (in the order of 200-300 Kg.).

It is thus an object of the invention to significantly simplify the construction of and the control over filtering systems comprised of conventional filter elements. It is a further object of the invention to provide a filtering system wherein each filter device thereof will comprise at least two filter elements connected in parallel so that flushing of one of the elements will not affect the operation of the complete filter device, namely, put it out of circulation with respect to the system.

It is a still further object of the invention that flushing cycles will be effected by clean, filtered water.

It is a still further object of the invention that such filter devices be provided with self-controlled filter elements of the discs type, wherein during flushing stages thereof, the discs are separated or released from their compact engagement to be more thoroughly rinsed by reverse flow flushing water.

It is a still further object of the present invention to use hydraulic means that will successfully replace the mechanical means.

SUMMARY OF THE INVENTION

According to one aspect of the invention there is provided an in-line liquid filter device which comprises a housing having an inlet port at one side and an outlet port at another, opposite side thereof. A first compartment is formed within the housing, communicating with the outlet port and including a filter element which comprises a filtering media through which the liquid is adapted to pass from one side-surface to another side-surface thereof, and reversely from the other side-surface to the one side-surface for flushing the filter media. A second compartment is provided within the housing communicating with the inlet port at one side and with the first compartment at another side thereof. The second compartment includes a first-valve for controlling the flow of the liquid from the inlet port to the first compartment, and a second valve for controlling the flow of liquid from the first compartment to outside the housing. Means are provided for selectively closing the first valve and for feeding liquid to the filter element while the first valve is closed so that the liquid flows through the filtering media in the flushing direction and drains by the second valve.

The housing may be generally cylindrical, the first and second compartments being defined between three distanced, radially extending partitions.

According to a further aspect of the invention the housing comprises at least one axially extending partition passed between the first and third partitions and across the second partition, forming at least two of the said first and second compartments. Each of the first compartments is provided with at least one filter element and each of the second compartments is provided with at least one first valve and one second valve.

According to a still further aspect of the invention the filtering media is constituted by a pack of discs with roughened side-surfaces in a compact engagement. The pack of discs is clamped between a fixed surface and a displaceable surface, facing each other. The fixed surface is associated with a generally cylindrical member supporting the discs and allowing passage of the fluid therethrough in the radial direction. The displaceable surface is associated with a hydraulically dispaceable cylinder member co-operating with a fixed piston member, the displacement of the cylinder being controlled by the fluid pressure difference between the outside and the inside of the disc pack.

BRIEF DESCRIPTION OF THE DRAWINGS

These and further constructional features, advantages and applications of the invention will become more fully appreciated in the light of the ensuing description of a few preferred embodiments thereof, given by way of example only, with reference to the accompanying drawings, wherein.

DETAILED DESCRIPTION OF THE PREFERRED EMBODIMENTS

Figure 1:
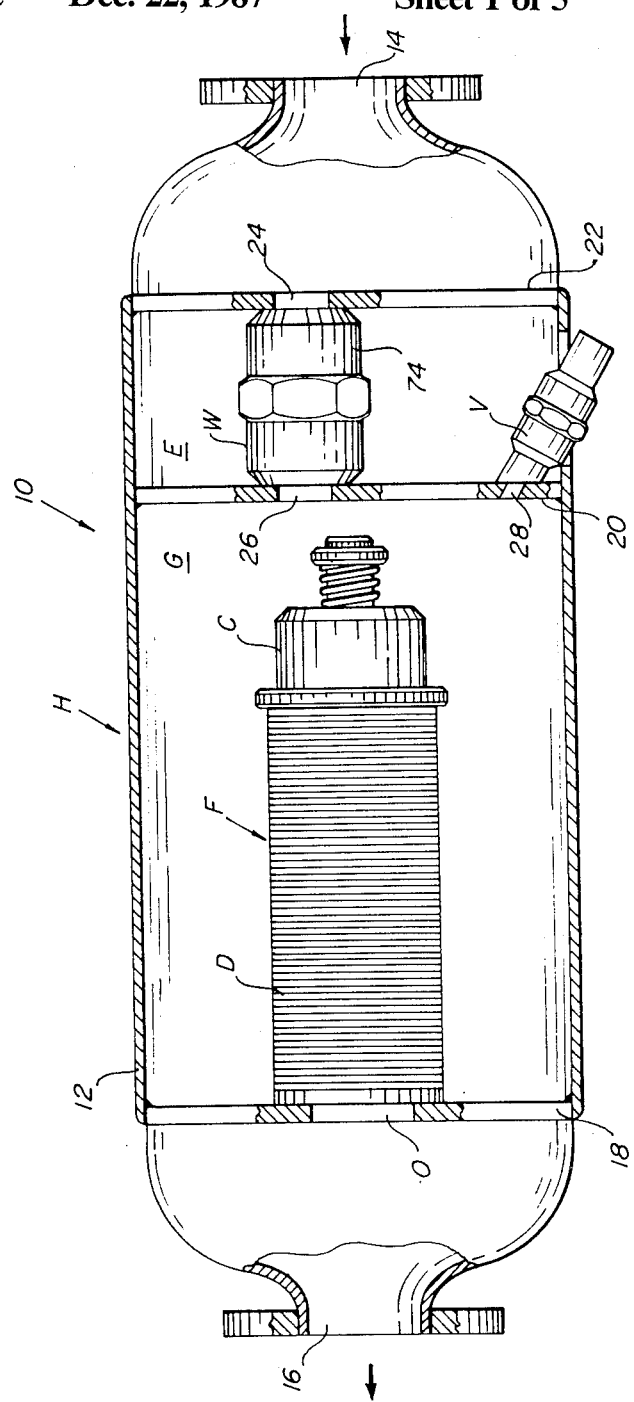
FIG. 1 is a cross-sectional view of an in-line filter device with reverse-flow control and drain valves according to the invention.
Figure 2:
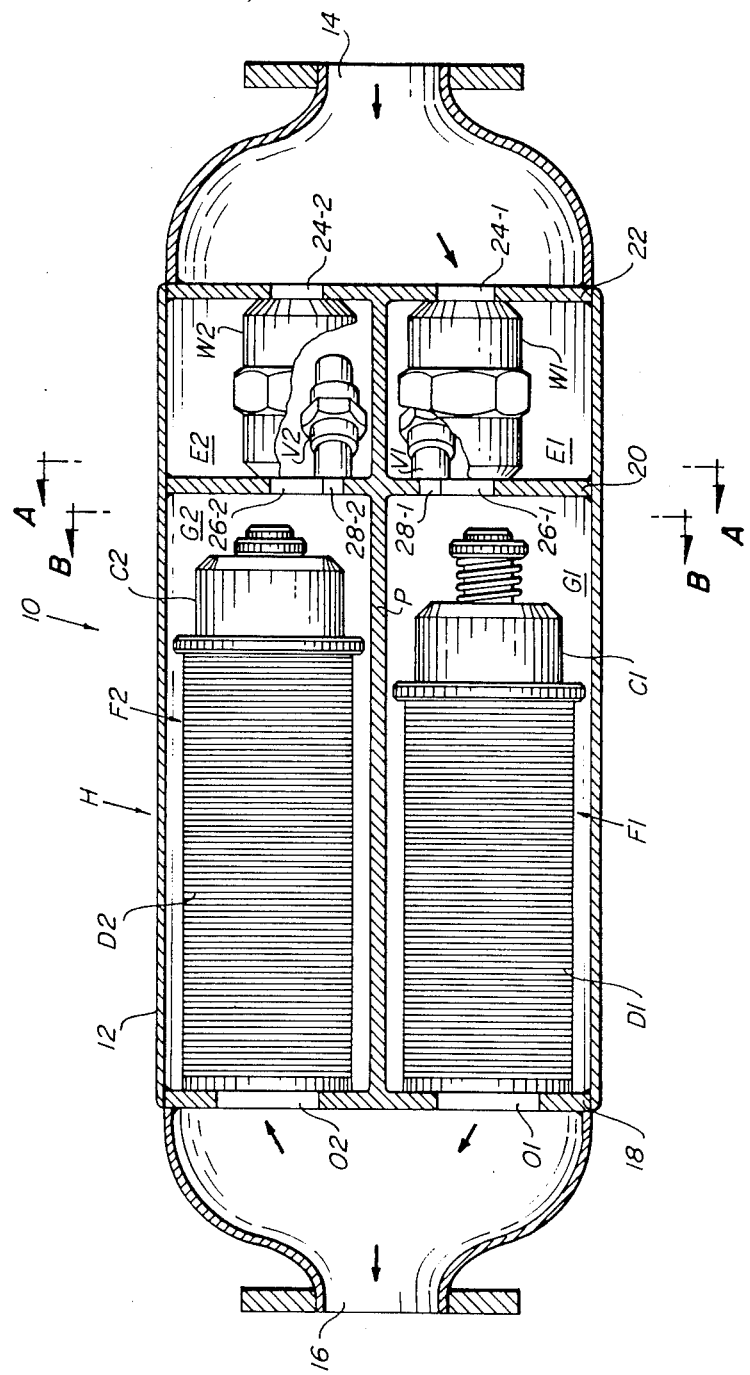
FIG. 2 is a cross-sectional view of a dual-type filter device.
Figure 3:
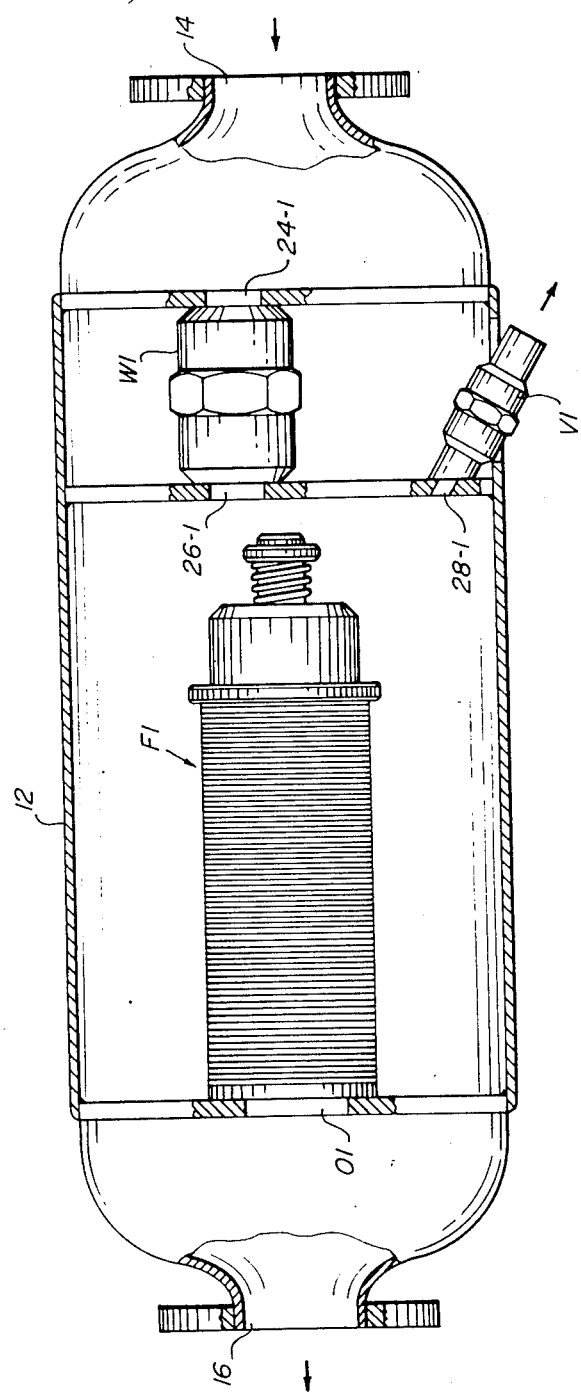
FIG. 3 is a cross-sectional side-view of the device of FIG. 2.

FIG. 1 shows a basic arrangement according to the invention of a filter device 10, comprising a filter element F installed in a housing H—which is common to the following embodiments of FIGS. 2–6 as well.

In more detail, housing 12 is in the form of a cylindrical shell 12 with an inlet port 14 and an outlet port 16. Three partitions 18, 20 and 22 divide the shell 12 into a first filter compartment G and a second, valves compartment E. While the filter F is of the special design and type as described below with reference to FIGS. 7 and 8, it should be understood that the invention as herein disclosed is applicable to practically all kinds of filter elements that are known in the art to be subject to back-flow, flushing, intermittent operation.

Bearing this reservation in mind, the illustrated filter F generally comprise a pack of discs D and a hydraulically displaceable cylinder C which is adapted to automatically release the discs upon the reversal of the water flow therethrough (see below).

The filter F is mounted on the partition 18 in which outlet O is made in direct communication with the outlet port 16. A first, water inlet control valve W is installed by and between the partitions 20 and 22, with valve inlet and outlet openings 24 and 26. valve W may be a remotely controlled, solenoid or the like operated valve, or a one-way, pressure responsive valve of any known type. A second, drain valve V—which may be a simple check valve—communicates the compartment G with outside the shell 12 through opening 28 in the partition 20. The general operation of the device 10 is as follows (more details are given below with reference to FIGS. 7 and 8). During normal, forward filtering flow from the inlet port 14 to the outlet port 16, the valve W is open and valve V is closed. Filtered water is discharged through the outlet O. For reverse, flushing flow, valve W is closed, and water fed into the filter inlet O and through the filter-media (in this case—pack of discs D), is discharged and drains by the valve V.

This basic, in-line filter structure and mode of operation find its particularly useful application in the context of multiple-filter elements design illustrated and further developed with reference to the embodiments of FIGS. 2–6 (wherein similar reference symbols have been used to denote parts and components analogous to those of FIG. 1). Hence, in the embodiment of FIGS. 2 and 3, the filter device is provided with a pair of filter elements F1 and F2. The elements are mounted on the partition 18 and accommodated within respective compartments G1 and G2. The compartments G1 and G2—as well as E1 and E2—are formed by a central partition P which divides the shell 12 into two, half-cylindrical spaces (see FIG. 4a). Compartments E1 and E2 between the partitions 20 and 22 house the valves W1 and V1, and W2 and V2, respectively, all in the manner similar to that of the embodiment of FIG. 1.

The operation of the filter device is such that during the normal, forward flow, both filters elements F1 and F2 will perform their filtering function, being connected in parallel, namely both feeding the outlet port 16 through the outlets O1 and O2, respectively.

Should now one of the filters, say F2, be cleaned, what only required is to close the valve W2. This will cause part of the water filtered by element F1 (supplied through openings 24-1 and 26-1 of valve W1) and discharged through the outlet O1, to enter outlet O2. Since the compartment G2 is now released from the network pressure, the water will flow in reverse direction with respect to the filter element F2, flush the same (with or without the separation or loosening of the discs by the hydraulic cylinder C2, as the case may be) and become drained through check valve V2. Two major operational features are to be noted: One, that the filter device as a whole does not cease to function, but continue to supply filtered water to the irrigation line and is not put completely out of circulation as in the conventional arrangements; and secondly, that the flushing water of one element is in fact the product of the other filter element, namely already clean filtered water, in contradistinction to the conventional arrangements where plain, unfiltered water has been used for cleaning the filters.

It will further be noted that the filter device as a whole is of a streamlined structure with no sharp flow-direction changes or corners, which is a most important feature in fluid flow devices generally—and filters in particular; and that the filter device housing 12 is of a simple, symmetrical shape and is therefore not subject to unbalanced forces as in the conventional design, wherein both the inlet and the outlet ports were installed at one and same side of a shell, closed at its other side by a dome-shaped cover, resulting excessive internal pressures within the filter casing.

Figure 4A:
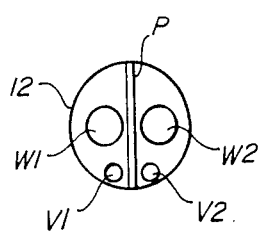
FIGS. 4a–4c illustrate respectively, valves arragements of housings divided into two, three and four setions, as schematically seen along line A—A of FIG. 2.
Figure 4B:
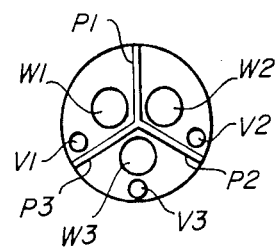
Figure 4C:
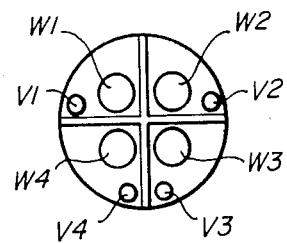

FIGS. 4a-4c illustrate various arrangements of inlet control valves W and associated drain valves V. Hence, FIG. 4a corresponds to the arrangement of FIGS. 2 and 3 and need not be further explained; FIG. 4b shows an arrangement of three inlet valves W1-W3 and corresponding drain valves V1-V3, the latter being always installed at the lowermost location regarding the respective compartments of their associated filter.

Figure 5A:
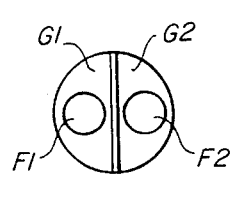
FIGS. 5a–5c illustrate the filter elements arrangement corresponding to the three options of FIG. 4, as seen along line B—B of FIG. 2.
Figure 5B:
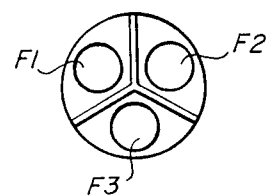
Figure 5C:
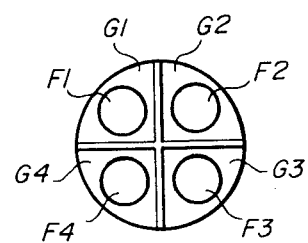
Figure 6A:
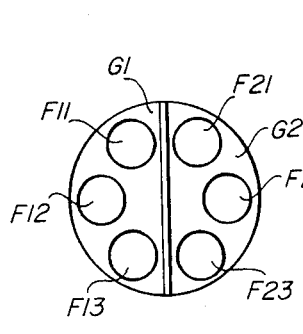
FIGS. 6a–6c show other arrangements of filter elements within each section of the three optional divisions.
Figure 6B:
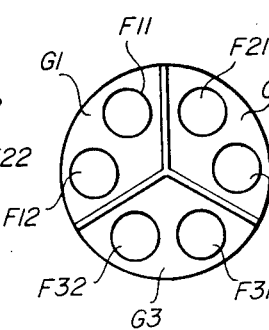
Figure 6C:
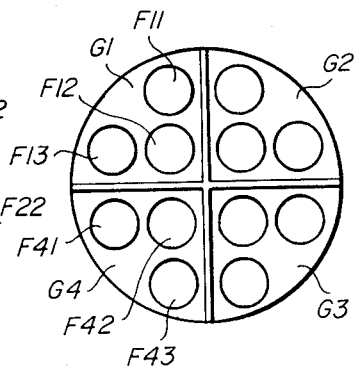

The division of the housing 12 into two sections still allows the provision of more than one filter element per compartment, e.g. three elements F11, F12 and F13 at compartment G1, and elements F21, F22 and F23 in the second compartment G2. as schematically illustrated in FIG. 6a The triple-compartment arrangement, which is common to FIGS. 4b, 5b and 6b, and the quadrial division of FIGS. 4c, 5c and 6c are self-explanatory and need not be described in detail, but only exemplifies the versatility of the conceptual approach proposed according to the present invention. For example, in the embodiment illustrated in FIG. 6b, the arrangement may be such that filters included in two compartments will operate to flush the filters of the remaining compartment, and the same applies to the configuration of FIG. 6c. In general, the more filter elements included in a single filter device, the less significant will be the pressure drop and water supply decrease which is inevitably involved for every flushing operation of any one or more of the filter elements included in a given filter device.

It will be now readily appreciated that the multi-filter elements filtering devices concept renders the filtering system as a whole much less complicated, and its control and operational characteristics are simple, reliable and therefore less costly comparable with the conventional systems.

As already emphasised above, the filter elements may be used of any conventional type, and even need not to be of the disc-type; however, it has been found most advantagous to adopt for the purpose at hand the novel disc filter construction to be now described in greater detail with reference to FIGS. 7 and 8.

Figures 7, 8:
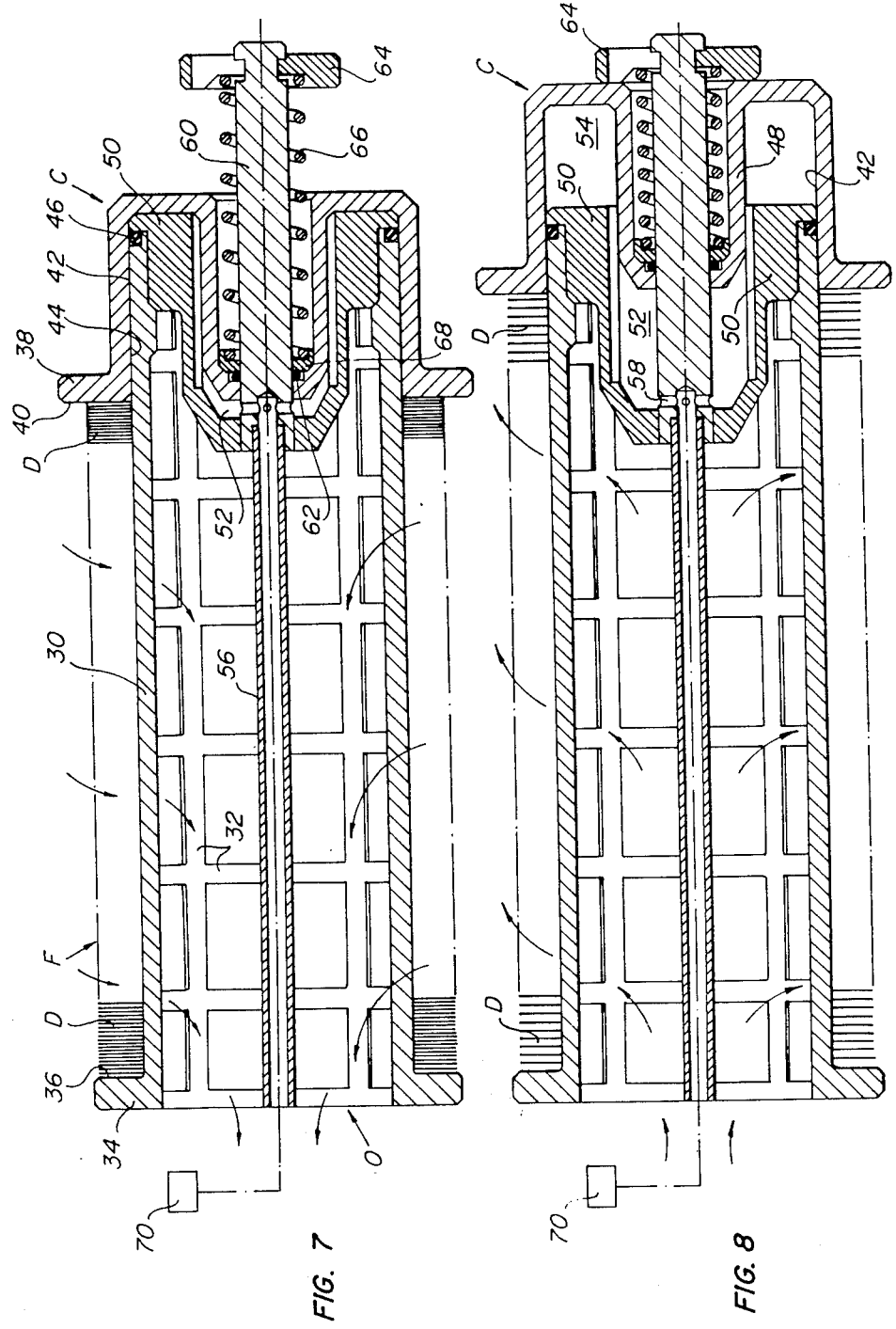
FIG. 7 is a cross-sectional view of a filter element of FIGS. 1–3 in a closed, disc-compacting position.
FIG. 8 shows the filter element of FIG. 7 in its open, flushing operative position.

In FIG. 7, there is shown the filter element generally designated F, which comprises a cylindrical inner member 30 of a cage-like structure, namely comprising cross ribs 32. The front end of the member 30 is provided with a flange portion 34 whose side surface 36 serves an abutment for the pack of discs D.

At the other end of the element F, there is provided the cylindrical member C which comprises the following portions: A flange portion 38 with surface 40 constituting the counterpart of surface 36; inner cylindrical surface 42 cooperating with an outer, solid surface 44 of the cylinder 30, with a sealing ring 46; a cup-shaped portion 48 freely fitting into a complementary member 50, forming an inlet chamber 52 communicating with an annular chamber 54 (FIG. 8), which chambers together constitute the active space which is hydraulically controlled in the manner to be described below.

Chambers 52 and 54 communicate with outlet O of the filter F through conduit 56 and bores 58, as shown. A spindle 60 extends axially, forming a guide rod of the cylinder C, with sealing ring 62, and is provided with a spilt ring or button 64. A coil spring 66 is interposed between the ring 64 and a bottom wall 68 of the inner cup-shaped portion 48. The filter element so far described operates in the following manner: Let us assume that liquid to be filtered is introduced from the exterior of the element F, namely, to flow in the inward radial direction through the disc pack D and the cage-like structure of the support member 30, and discharged in the axial left-hand direction, as shown by the arrows in FIG. 7. In this case, the pressure prevailing outside the element will be equal to the network supply pressure, while inside the member 30 the pressure is lower, namely that of the consumer, e.g. the irrigation line connected to the outlet of the filter unit (such as outlet port 16 in FIG. 1).

The same outlet pressure is maintained inside the cylinder C (chamber 52).

Under these conditions, a force directly proportional to the cross-sectional area of the chambers 52 and 54 (see FIG. 8) will act in the left-hand direction, i.e. to further tighten the disc pack D. It can be shown that for filters of average size and under normal network pressures, a compacting force in the order of several hunderds of Kgs. is readily achieved.

Now for untightening the disc pack D, i.e. displacing the cylinder C into the position shown in FIG. 8 (or C2 in FIG. 2), the flow direction is reversed—in the manner described above or otherwise—so that the reverse flow pressure will reach through the conduit 56 and built up within the chambers 52 and 54, while the pressure outside the cylinder (and filter element F) is reduced as the water supply having been cut off.

The cylinder moves in the righthand direction and the discs become separated as well as rinsed by the backwards flow, as denoted by the arrows in FIG. 8.

It will be noted that the spring 66 is only provided for holding the discs together, e.g. in the case of a network pressuse failure where the pressures at both sides of the cylinder C become equalized.

It has been mentioned before that the displacement of the cylinder C can be positively attained irrespective of and in addition to the pressure difference generated during the flushing flow cycles. To this end, the conduit 56 should be extended by a control line, shown in dash-dotted lines in FIGS. 7 and 8, and connected to an external control unit schematically represented by the block marked 70. If a sufficiently high pressure is introduced by the control unit 70, the cylinder C will move to the right against both the spring 66 and any pressure prevailing within the filter housing 12 (FIG. 1), and the discs will no longer be compressed by the flange 38. In fact, such control over the discs compacting and release is readily available by the unit 70 even during forward, filtering flow, if applicable.

This unique construction and mode of operation of the automatically—and/or controlled—compacting and releasing filter element, and the manner of installing same as a single, in-line filter (FIG. 1), or in groups (FIGS. 2-6) opens the way for the development of completely independent systems which will need very little maintenance and care for replacing clogged or otherwise malfunctioning filter units, a feature of great importance in case of filter systems composed of a large number of units, remotely located in the fields with a central, computer-contolled operation, where the servicing expenses are especially high.

Those skilled in the art will readily understand that numerous changes, modifications, and variations may be applied to the invention as above-exemplified without departing from its scope as defined in and by the appended claims.

What is claimed is:

1. An in-line liquid filter device comprising:
   (a) A housing having an inlet port at one side and an outlet port at another, opposite side thereof;
   (b) a first compartment within the housing communicating with the outlet port;
   (c) a filter installed within the first compartment, the filter comprises a stack of individual filter elements through which the liquid is adapted to pass from one side-surface to another side-surface thereof ("the filtering flow direction"), and reversely from the other side-surface to the one side-surface for flushing the filter elements ("the flushing flow direction");
   (d) a second compartment within the housing communicating with the inlet port at one side and with the first compartment at another side thereof;
   (e) a first valve within the second compartment for controlling the flow of the liquid from the inlet port to the first compartment;
   (f) a second valve within the second compartment for controlling the flow of liquid from the first compartment to outside the housing;
   (g) means for selectively closing the first valve; and
   (h) means for feeding liquid to the filter while the first valve is closed so that the liquid flows through the filter elements in the flushing direction and drains by the second valve for enabling release of said elements from compact engagement sufficient to enable improved ringing by reverse flow flushing liquid.

2. The device as claimed in claim 1 wherein the housing is generally cylindrical, the first compartment being defined between a first and second, distanced, radially extending partitions.

3. The device as claimed in claim 2 wherein the second compartment is defined between the second and a third, distanced, radially extending partition.

4. The device as claimed in claim 3 wherein the filter is mounted on the first partition with the said other side-surface thereof communicating with the outlet port through an opening formed in the said first partition.

5. The device as claimed in claim 4 wherein the first valve is mounted between oppositely located openings provided in the second and third partitions, respectively.

6. The device as claimed in claim 5 wherein the second valve is mounted on the second partition.

7. The device as claimed in claim 6 wherein the first valve is a pressure-responsive, one-way valve.

8. The device as claimed in claim 7 wherein the second valve is a pressure-responsive, one-way valve.

9. The device as claimed in claim 6 wherein the first valve is provided with remotely controlled valve closing means.

10. The device as claimed in any one of claims 2-6 wherein the housing comprises at least one axially extending partition passed between the first and third partitions and across the second partition, forming at least two of the said first and second compartments, each of the first compartments being provided with at least one filter and each of the second compartments being provided with at least one first valve and and one second valve.

11. The device as claimed in claim 1 wherein the filter elements are constituted by a pack of discs with roughened side-surfaces in a compact engagement.

12. The device as claimed in claim 11 wherein the pack of discs is clamped between a fixed surface and a displaceable surface, facing each other, the fixed surface being associated with a generally cylindrical member supporting the discs and allowing passage of the fluid therethrough in the radial direction, and the displaceable surface is associated with a hydraulically dispaceable cylinder member co-operating with a fixed piston member, the displacement of the cylinder being controlled by the fluid pressure difference between the outside and the inside of the disc pack.

13. The device as claimed in claim 12 wherein the displaceable cylinder member is mounted on an extended, solid wall portion of the disc supporting member, which forms the said fixed piston member.

14. The device as claimed in claim 13 further comprising external hydraulic control means connected by a conduit extending along the inside of the cylindrical support member to communicate with the inside of the said displaceable cylinder member.

15. The device as claimed in claim 14 wherein the hydraulic means are adapted to introduce pressurized fluid into the displaceable cylinder for displacing same during fluid flow through the disc pack in the flushing direction.

16. The device as claimed in claim 15 wherein the displaceable cylinder is spring urged in the direction of the said fixed surface.

* * * * *